Feb. 18, 1941.   C. G. TALBOT ET AL   2,232,415
BATTERY CONTAINER
Filed Sept. 26, 1938

Inventors:
Cyrus G. Talbot
Adrian H. Townsend
By: Stevens & Batchelor
Atty's.

Patented Feb. 18, 1941

2,232,415

UNITED STATES PATENT OFFICE 2,232,415

BATTERY CONTAINER

Cyrus G. Talbot and Adrian H. Townsend, Chicago, Ill.

Application September 26, 1938, Serial No. 231,840

6 Claims. (Cl. 136—170)

Our invention relates to storage batteries, and more particularly to means for protecting the same against the escape of fumes to surrounding parts or objects, and our main object is to provide a container for this purpose which confines condensed fumes to a zone immediately surrounding the points where they issue.

A further object of the invention is to include in the novel container a hermetically-closed chamber which arrests the passage or seepage of acid or moisture into the balance of the container.

Another object of the invention is to include in the novel container a vessel which is of a yieldable material and compressible by the closing of the container to procure the hermetical contact therewith.

An additional object of the invention is to construct the container and units pertaining thereto along lines of simplicity, dependability and durability.

With the above objects in view, and any others which may suggest themselves from the description to follow, a better understanding of the invention may be had by reference to the accompanying drawing, in which—

Figure 1:
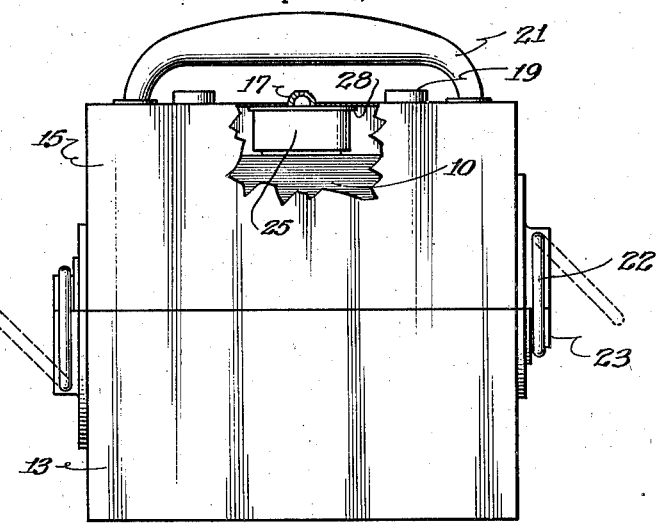
Fig. 1 is a front elevation, partly broken away, of the container and the battery housed therein.
Figure 2:
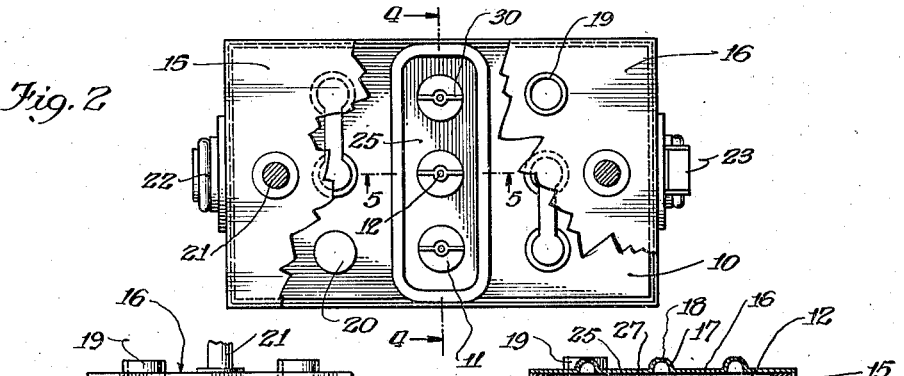
Fig. 2 is a plan view, partly broken away.
Figure 3:
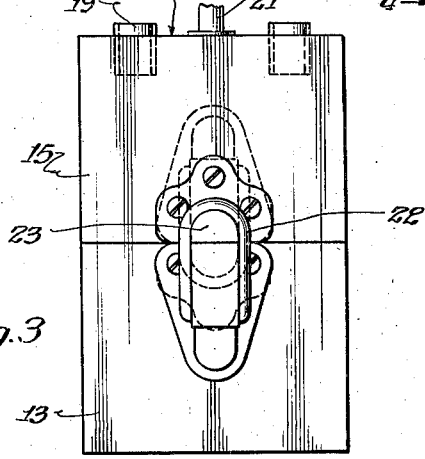
Fig. 3 is a view from the left-hand end of Fig. 1.
Figure 4:
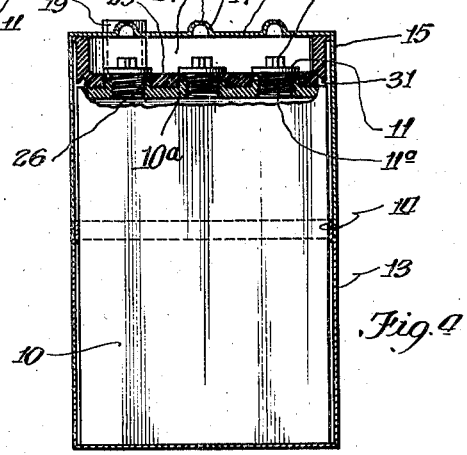
Fig. 4 is a cross-section on the line 4—4 of Fig. 2, with the battery shown in elevation.
Figure 5:
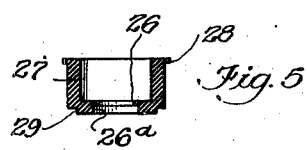
Fig. 5 is a cross-section on the line 5—5 of Fig. 2.

The increasing use of storage batteries has placed them in close proximity to metallic objects or articles subject to corrosion or injury from condensed acid fumes. This item has been of even greater importance where the batteries are installed in automobiles, boats or other places which are subject to vibration and change of position. It is customary, therefore, to find that the top of a storage battery is wet or slimy with acid, especially during or after the charging of the battery. Thus, where the battery is subject to vibration or movement, some of the acid escapes to the battery container if one is used or to surrounding parts or objects, causing corrosion or unclean conditions. Also, where a battery is ordinarily level and retains what acid condenses on its top, the freedom of escape of the acid fumes during charging causes these to condense on the inner walls of a container or on surrounding parts or objects, with the same injurious or undesirable effect. It has therefore been a problem to so protect a battery so as to prevent the escape of the acid during use or charging, and we have endeavored to solve the same in the present invention.

In accordance with the foregoing, specific reference to the drawing indicates a typical storage battery at 10, the same having the usual filler caps 11 and vents 12.

Primarily, the novel container comprises a metal box 13 to receive the battery and extend approximately half its height, the box having a reduced rim 14 to fit the walls of the battery. The box receives a cover 15 from above, the same fitting the step formed by the rim 14 and securing a flush external joint with the box. The cover rises a short distance above the battery; and its top 16 is formed with a set of domes 17 over the vents 12, the domes being perforated at 18. Also, the top has suitable outlets 19 for leads (not shown) taken from the battery terminals 20.

The top of the cover 15 receives a suitable handle 21, and it is intended that the entire container be carried by means of the same. For this purpose the ends of the battery are fitted with swingable clips 22 adapted to be sprung over keepers 23 in order to keep the sections of the container together. Fig. 1 shows that the securing device at one end of the battery is inverted in relation to that of the other end thereof, in order to make it imperative to assemble the container in proper endwise relation to correspond with the positions of the terminal posts 20, and so make sure that the outlets 19 are over the respective posts. Dotted lines in Fig. 1 show the manner in which the clips are swung to secure their release.

In order to confine the products of condensation close to the vents 12 from which the said fumes issue, we have devised a cup 25 as a retaining vessel for the same, the cup occupying a transverse position over the top of the battery. The bottom 25 of the cup is formed with perforations 26 in registration with the filler caps 11 and fits closely around the screw-shanks 11a of the same; and the perforations 26 are counterbored at 26a from the bottom to receive the battery filler necks 10a. The walls 27 of the cup rise to the top 16 of the cover. They may be plain or outwarly flanged as indicated at 28 to offer a larger contact surface opposite the container top. The walls take a marginal reduction 29 at the bottom.

The cup 25 is made of a material which is both yieldable and impervious to said fumes or condensations, the material preferably being gum rubber. Thus, the portions surrounding the screw-shanks 11a serve as rubber washers when the filler caps 11 are screwed down, preventing the leakage or seepage of acid from the filler necks 10a to the battery top. With the cup walls rising to the top of the cover any acid or moisture escaping from the vents 12 when the battery is agitated or being charged will be retained within the cup. The height of the cup is such as to support the container cover 15 slightly above its final closing place. Thus, it will require some down-pressure on the cover to permit the clips 22 to engage their keepers. This pressure is of course resisted by the cup walls 27 to the extent that they sink at their weakened corners as indicated at 31 and direct a constant pressure against the cover top 16. The rim of the cup thus forms a hermetic closure with such top which, together with the tight closure of the cup bottom around the filler cap shanks, previously described, results in a confined chamber to retain any products of condensation settling in the zone above the filler caps.

It is of course desirable that a battery be vented at all times, and especially for the escape of fumes during charging, and it is seen that this process is made possible by the location of the escape domes 17 directly over the vents 12. The natural rise of gases or fumes through the domes to the atmosphere will cause them to evaporate and leave no trace. However, such fumes as are heavier and meet the top of the cover will assume a tendency to condense, and if this occurs the liquid will drip or eventually trickle down to the bottom of the cup 25. However, a tendency toward an excessive accumulation will only arise when the battery is being charged, and in this event the warmth of the battery top and the cup will promote the partial evaporation and escape of the accumulations, so that these do not increase materially. In any event, injury to the container is prevented by having the inner surface thereof lead-coated, particularly in the region of the cup 25, and painted in addition, whereby to become proof to the vapors and acid moisture rising from the battery.

It will be evident from the foregoing that we have provided a container which not only makes it safe to carry or keep the battery in positions away from the upright one, but also maintains the battery in a dry and clean external condition. Thus, the battery may be placed or kept in proximity to metallic or valuable equipment without causing injury to the same. Further, the novel container makes it safe to charge the battery without fear that it will spread injurious moisture and accumulations to surrounding articles, it being understood of course that the charging rate should not be excessive. The cup 25 is novel as an automatic closure by the fact it exerts its own pressure to keep in firm contact with the container top. The bottom corner construction of the cup is more yieldable than the walls thereof, so that these do not bulge or buckle from the pressure to prejudice flat contact of the cup with the top of the container. The joint between the sections of the container not only provides a support for the battery when the container is carried, but also induces the compression of the cup 25 to procure its closure. Finally, it is evident that the parts entering into the container and its units are of simple and sturdy design and of a nature to be manufactured economically.

While we have described the invention along specific lines, various minor changes and refinements may be made without departing from the principle of the invention, and we desire to consider all such changes and refinements as coming within the scope and spirit of the appended claims.

We claim:

1. The combination with a storage battery having a filler neck rising from its top, a vented closure for the filler neck, and a container for the battery; of a removable cover for the container, a cup having a solid upstanding wall of slightly yieldable material, said cup having a perforation in its bottom for the tight insertion of said filler neck, the cup being open to afford unrestricted access to said filler neck and closure when the cover is removed, said wall being of a height to meet said cover and procure a seal therewith by being slightly compressed when the cover is closed on the container, and said cover having a vent in the area sealed by said wall.

2. The combination with a storage battery having a filler neck rising from its top, a vented closure for the filler neck, and a container for the battery; of a removable cover for the container, a cup having a solid upstanding wall of slightly yieldable material, said cup seating on said top and having a perforation in its bottom for the tight insertion of said filler neck, the cup being open to afford unrestricted access to said filler neck and closure when the cover is removed, said wall being of a height to meet said cover and procure a seal therewith by being slightly compressed when the cover is closed on the container, and said cover having a vent in the area sealed by said wall.

3. The combination with a storage battery having a filler neck rising from its top, a vented cap for said filler neck with a plug depending into the latter, and a container for the battery; of a removable cover for the container, a cup having a solid upstanding wall of slightly yieldable material, said cup having a perforation in its bottom of a size for the passage of said plug and the clamping of the perforation rim between the cap and the filler neck, said bottom being continued below said perforation with a larger perforation of an area to permit the insertion of said filler neck, the cup being open to afford unrestricted access to said filler neck and cap when the cover is removed, said wall being of a height to meet said cover and procure a seal therewith by being slightly compressed when the cover is closed on the container, and said cover having a vent in the area sealed by said wall.

4. The combination with a storage battery having a filler neck rising from its top, a vented cap for said filler neck with a plug depending into the latter, and a container for the battery; of a removable cover for the container, a cup having a solid upstanding wall of slightly yieldable material, said cup seating on said top and having a recess in its bottom from the under side for the tight upward insertion of said filler neck, the ceiling of said recess overlying the top of the filler neck to be clamped to the latter by said cap and being perforated for the passage of said plug, the cup being open to afford unrestricted access to said filler neck and cap when the cover is removed, said wall being of a height to meet said cover and procure a seal therewith by being slightly compressed when the cover is closed on the container, and said cover having a vent in the area sealed by said wall.

5. The combination with a storage battery having a series of filler necks rising from its top, a vented closure for each filler neck, and a container for the battery; of a removable cover for the container, a cup surrounding the filler neck group and having a solid upstanding wall of slightly yieldable material, the cup having a series of perforations in its bottom for the tight insertion of each of said filler necks, the cup being open to afford unrestricted access to all the filler necks and closures when the cover is removed, said wall being of a height to meet said cover and procure a seal therewith by being slightly compressed when the cover is closed on the container, and said cover having a vent above the site of each filler neck.

6. The structure of claim 2, the bottom outer edge of the cup being grooved to create a factor of added yieldability in the bottom of said wall with downward clearance for said edge, whereby to prevent buckling of the wall when the closing of the cover imposes more than the slight degree of compression on said wall.

CYRUS G. TALBOT.
ADRIAN H. TOWNSEND.